United States Patent [19]
Berney

[11] 3,937,001
[45] Feb. 10, 1976

[54] WATCH MOVEMENT DRIVEN BY A SPRING AND REGULATED BY AN ELECTRONIC CIRCUIT

[76] Inventor: Jean-Claude Berney, Chemin de Fontadel 15, Prilly, Vaud, Switzerland

[22] Filed: Nov. 20, 1973

[21] Appl. No.: 417,588

[30] Foreign Application Priority Data

Nov. 21, 1972 Switzerland ........................ 16918/72

[52] U.S. Cl. ................. 58/23 D; 58/28 R; 74/404.5; 318/147; 318/318; 322/29

[51] Int. Cl.² .. G04C 3/04; F16H 57/10; H02P 5/00

[58] Field of Search ...... 58/23 R, 23 A, 23 D, 28 R, 58/28 A, 28 B, 28 D; 74/404.5, 411; 318/318, 147; 322/29, 31, 32

[56] References Cited

UNITED STATES PATENTS

| | | | |
|---|---|---|---|
| 2,886,766 | 5/1959 | Gibson | 322/31 |
| 3,134,220 | 5/1964 | Meisner | 58/28 A |
| 3,344,360 | 9/1967 | Moore et al. | 318/147 X |
| 3,451,210 | 6/1969 | Helterline, Jr. et al. | 58/26 R |
| 3,512,351 | 5/1970 | Shelley et al. | 58/23 A |
| 3,566,250 | 2/1971 | Ringstad | 322/32 |
| 3,648,453 | 3/1972 | Aizawa et al. | 58/23 V |

*Primary Examiner*—Edith Simmons Jackmon
*Attorney, Agent, or Firm*—Haseltine, Lake & Waters

[57] ABSTRACT

An electronically regulated watch movement comprising a time-wheel mechanism driven by a drive, a generator being coupled to the drive via at least a portion of the time-wheel mechanism and with substantial gear reduction. The generator includes a rotor with magnets and coils for producing a.c. voltage at a frequency of operation FG. An electronic regulating circuit is connected to the generator and includes an oscillator for producing a precise reference frequency FR and a comparator having inputs receiving frequencies FR and FG to compare the same. A power source is connected to the comparator and the generator to supply current to the generator when FG > FR to brake the generator until FG = FR and thereby provide a regulated operation of the time-wheel mechanism.

10 Claims, 6 Drawing Figures

WATCH MOVEMENT DRIVEN BY A SPRING AND REGULATED BY AN ELECTRONIC CIRCUIT

FIELD OF THE INVENTION

The invention relates to watch movements and particularly to watch movements which are regulated by an electronic circuit,

PRIOR ART

In electronic watch movements, it is generally necessary to change, each year, the batteries which supply the drive energy. This is considered to be undesirable and a commercial handicap to such watches.

It has been proposed to utilize a drive to transform the mechanical energy produced in the movements of the hands into electrical energy. This electrical energy is stored in an accumulator and feeds an electric motor at a stable speed of rotation (spiral oscillating motor, step by step motor, synchronous motor etc.). The motor drives the wheel mechanism for the hands of the watch. Such solutions have a poor efficiency of energy usage because mechanical energy is converted to electrical energy which has to be retransformed back into mechanical energy.

SUMMARY OF THE INVENTION

An object of the invention is to provide a watch movement which avoids the deficiency of the known movements by eliminating the electric motor.

In accordance with the invention an a.c. voltage of frequency FG is induced at the output of a generator driven by a spring motor through the intermediary of at least a part of the time wheel mechanism and with substantial demultiplication or gear reduction to minimize the energy supplied to the generator. The generator feeds an electric circuit comprising a precision oscillator furnishing by a division of the frequency, a reference frequency FR, a frequency comparator for FR and FG or multiples or divisions thereof, and a charge circuit connected to the comparator such that electric current deducted at the output terminals of the generator increases when FG is greater than FR and thus brakes this latter thereby re-setting the speed of rotation and hence the speed of rotation of the members of the time wheel mechanism to that corresponding to the reference frequency.

It goes without saying that the spring furnishing energy to the system can be rewound manually or automatically by diverse known means in the horological art.

DETAILED DESCRIPTION

Figure 1:
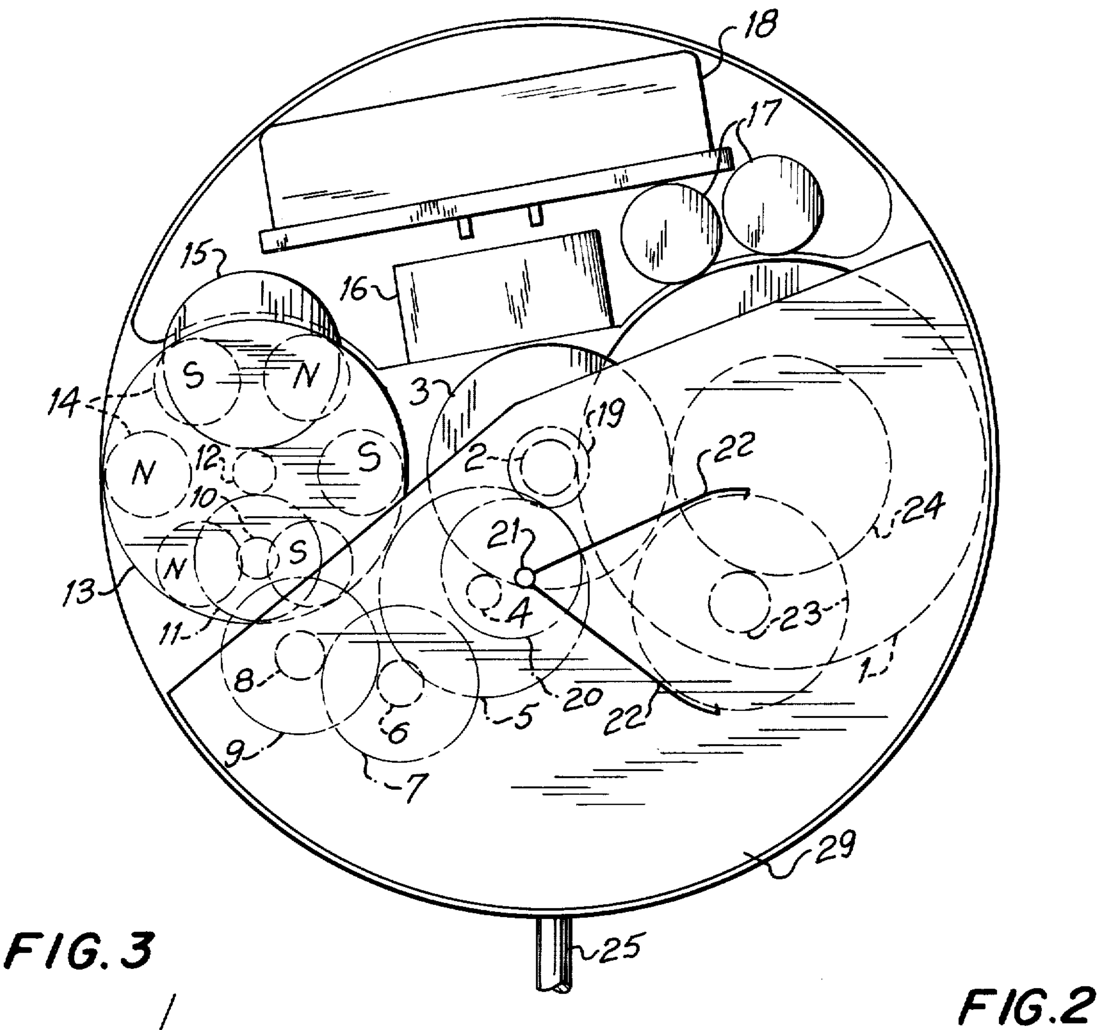
FIG. 1 is a very schematic illustration of the assembly of a watch movement including the drive therefor according to a first embodiment.

Referring to FIG. 1, therein is seen a watch movement which comprises a conventional spring-loaded driving drum 1 which drives a generator 13 through the intermediary of a portion of the time-wheel mechanism including wheels 3, 5, 7, 9, and 11 and pinions 2, 4, 6, 8, 10, and 12, the latter pinion being fast with a rotor of the generator 13 according to the first embodiment, the train of the interposed wheels providing a substantial demultiplication in order that the energy to drive the generator is relatively small.

The spring of the drum 1 is rewound automatically by a central rotor 29 driving two pawls 22 through the intermediary of pinion 19, wheel 20 and eccentric pin 21. The pawls 22 act on pawl wheel 23 and by this on ratchet wheel 24 such that the direction of rotation of pawl wheel 23, ratchet wheel 24 and drum 1 does not depend on the direction of rotation of rotor 29.

The generator 13 includes a rotor of soft iron on one side of which six magnets 14 are mounted and a fixed coil 15 is supported adjacent the rotor so that the magnets pass one by one in front of the coil 15 as the rotor turns.

The choice of six magnets is not limiting and any even number is suitable. It is also possible to have a plurality of coils, for example two, spaced 180° apart.

Figure 4:
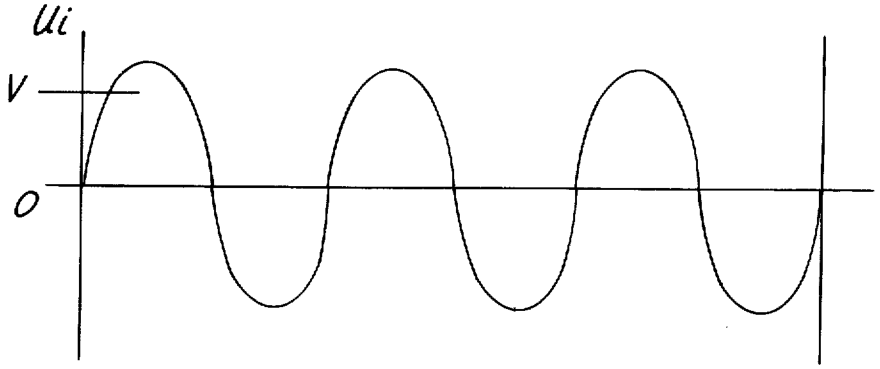
FIG. 4 is a graph of the induced voltage for the drive.

The six magnets have alternating north-south polarity in such fashion that when the rotor turns, an induced alternating voltage $U_i$ is produced at the output terminals of the coil 15 as shown in the voltage curve in FIG. 4 corresponding to one turn of the rotor.

An electronic circuit is connected to coil 15 and is essentially composed of an integrated circuit 16 which achieves a function to be described later. A quartz resonator 18 is connected to circuit 16 and provides a very stable frequency of oscillation while a trimmer 17 enables adjustment of the oscillation frequency of the resonator.

Figure 3:
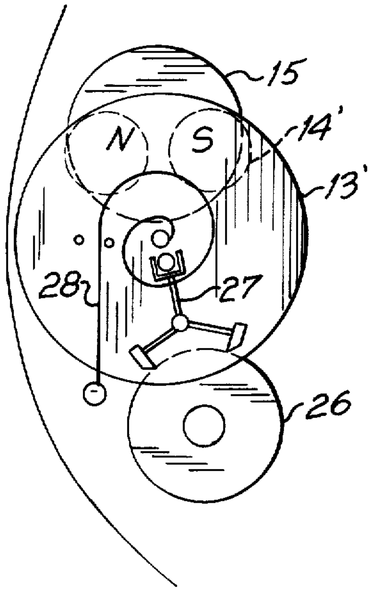
FIG. 3 is a very schematic illustration showing a drive according to a second embodiment.
Figure 2:
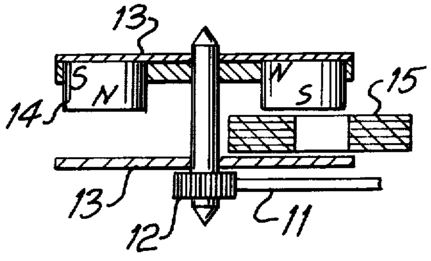
FIG. 2 is an axial sectional view of the drive.

FIG. 3 very schematically shows the disposition of the generator according to a second embodiment wherein the rotor 13' forms with spiral spring 28 an oscillator of the spiral pendulum type. Energy is transmitted to the generator from the drive wheel by a conventional escapement wheel 26 and escapement 27 while also providing substantial demultiplication.

The rotor only carries here two magnets 14' in opposed relation and passing alternatively in front of fixed coil 15 in which it also induces an alternating voltage $U_i$ as in FIG. 4.

The resonator thus constituted produces a frequency of oscillation FG which is variable in amplitude on the one hand and on the other hand in frequency from a reference FR due to isochronism defects. These variations of amplitude of oscillation are thus assignable to the variations of the speed of rotation of the generator. The electronic circuit acts in the same manner as in the case of the embodiment of FIG. 1, but this disposition has the advantage of fixing, at the outset, the speed of rotation of the wheel in the vicinity of the frequency of regulation FR.

Figure 5:
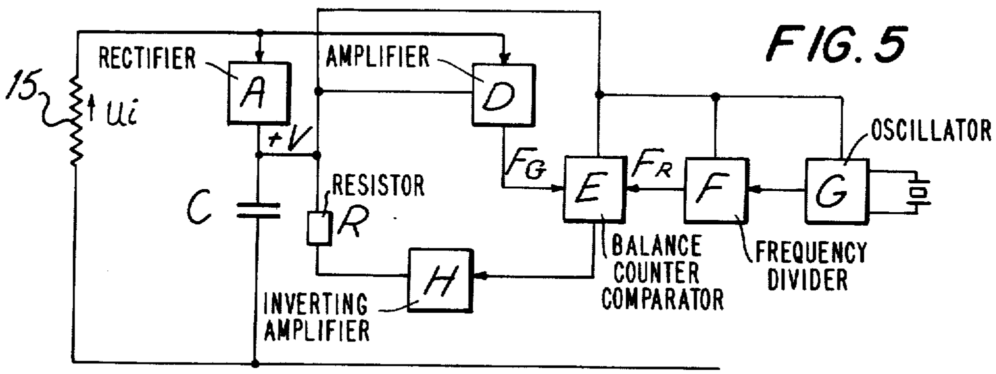
FIG. 5 is a schematic electronic circuit diagram according to a first embodiment.

FIG. 5 schematically shows the electronic circuit according to a first embodiment thereof and it can be integrated in technique CMOS having very low power consumption. It employs the quartz oscillator therein.

The circuit comprises a rectifier A which provides direct voltage V from the induced voltage $U_i$ produced at the coil output terminals. This voltage is integrated in condensor C and permits feeding elements D, E, F, G, H in which D is an amplifier which permits formation of voltage $U_i$ at frequency FG;

G is the quartz oscillator;

F is a frequency divider furnishing reference frequency FR; and

E is a comparator for frequencies FG and FR and furnishing a logical or analog signal as a function of the variation between FG and FR. This comparator can be a simple phase comparator or of any other suitable type as well known to those skilled in the art.

One such arrangement can consist, for example, of a bidirectional or balance counter. The frequency FG is applied to one input of the counter and the frequency FR to the other and if the impulses are equal, i.e. FR = FG, the counter is at rest. If FG is greater than FR the counter indicates a decreasing quantity. It is thus possible to provide at the output of the comparator a signal +V when FG > FR or a signal 0 when FG < FR.

H is a simple inverting amplifier. Its output is +V when signal 0 is applied to its input, i.e. when FG < FR. The current flowing in load resistor R is thus null. When FG > FR, +V is applied to the input of H and its output is 0. There is thus consumed in resistance R a power equal to $V^2/R$.

The operation of the electronic circuit is as follows:

It is well known that a drive can not provide greater electrical power than the mechanical power which it receives. It is also known that the spring of the drive furnishes a stable mechanical power. This power will be chosen so that when the resistance R is not active, it can furnish electrical energy to the electronic circuit which is stable and insures at the generator a speed of operation greater than the regulation speed. In these conditions, the frequency comparator detects FG > FR. The voltage at the output of amplifier H is 0.

When current flows through resistance R a supplemental power $V^2/R$ will be deducted from the generator. As the power furnished by the spring is constant, this supplemental power can only be deducted from the kinetic energy of the rotor of the generator which acts to brake the same. R will be selected in such manner that the speed of rotation will become less than the value of regulation. The frequency comparator thus reverses the signal in H. Power is no longer deducted from R, the drive accelerates up to the instant when FG > FR. There is therefore a regulation of FG to FR. The speed of rotation is thus regulated and the hand mechanism indicates the time with the precision given by the quartz oscillator. The regulation of power can therefore be expressed $$P_M - P_G - P_e - P_R = 0$$

wherein:

$P_M$ is the mechanical power delivered by the spring of the drive drum, $P_G$ is the power dissipated by the generator and the time wheel mechanism when turning at the speed of regulation, $P_e$ is the electric power consumed by the circuit, $P_R$ is the electric power of regulation, of a maximum of $V^2/R$ where $$V^2/R > P_M - P_G > P_e$$

It is thus seen that the factors $P_M$, $P_G$ and $P_e$ can vary in magnitude while this relation sill holds true.

Figure 6:
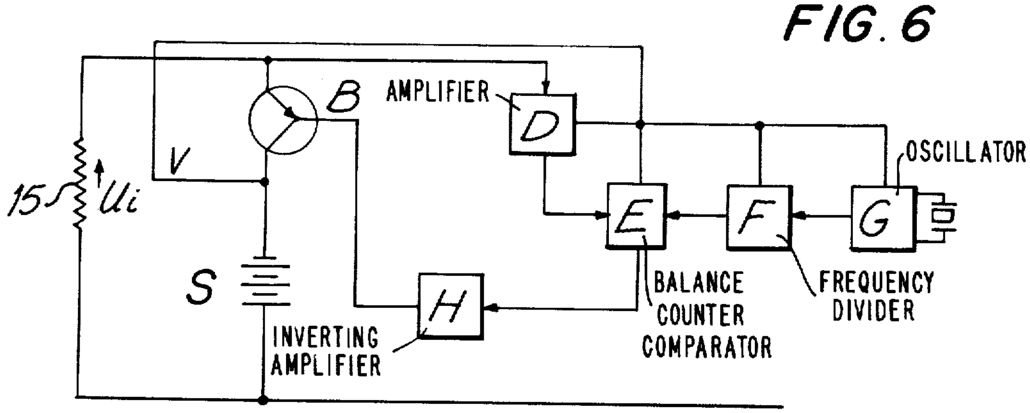
FIG. 6 is a schematic electronic circuit diagram according to a second embodiment.

FIG. 6 shows a second embodiment of electronic circuit which conforms to the required conditions.

Therein, the amplifier D, oscillator G, divider F, frequency comparator E and amplifier H function in the same manner as in the previously described circuit, but the condensor C is replaced by a small battery or accumulator S. There is employed a gating arrangement formed by transistor B. When FG > FR, the transistor is conductive. Power $P_a$ is deducted from the generator to brake the same. When FG < FR the transistor is non-conductive and power is no longer deducted from the generator. The advantage of this arrangement is the accumulation of the energy of regulation rather than its loss in the resistance. Based on an energy balance, at an average, the accumulated energy should be useful in the feed of the circuit according to the following equation.

$$P_e < P_M - P_G < P_A$$

In contrast, instantaneously, $P_A$ can become null since the feed is assured by the battery A and not by the generator.

$$P_e < P_M - P_G < 0$$

This gives a supplemental security of operation, e.g. for the passage of a day. On the other hand, the spring of the drive drum does not develop the same power over 36 hours.

In practice with a drive spring of 35 ergs/sec or 3.5 μ Watts existing in watches of so-called high frequency (36000 Ah), the following is obtained with the construction of the invention.

| | Maximum Value | μ Watts Average Value | Minimum Value |
|---|---|---|---|
| $P_M$ | 4.0 | 3.5 | 3.0 |
| $P_G$ | 2.0 | 1.0 | 0.5 |
| $P_A$ | | 5 | |
| $P_e$ | | 2.0 | |

Taking the most unfavorable case

| | |
|---|---|
| $P_{M\ min} - P_{G\ max} > 0$ | $3.0 - 2.0 = 1.0 > 0$ |
| $P_{M\ max} - P_{G\ min} < P_A$ | $4.0 - 0.5 = 3.5 < 5$ |
| $P_e < P_{M\ avg} - P_{G\ avg} < P_A$ | $2.0 < 3.5 - 1 = 2.5 < 5$ |

It is seen that if these values are respected, the assembly functions perfectly.

It is obvious that other drives having one or more pairs of magnets or one or more coils can be utilized.

The magnets can be removable or fixed as can be the coils.

There can also be used all known electronic circuits to permit variation of the output to the drive as would be evident to those skilled in the art.

What is claimed is:

1. A watch movement comprising a drive means, a time-wheel mechanism driven by said drive means, a generator coupled to said drive means via at least a portion of said time-wheel mechanism and with substantial gear reduction, said generator including means for producing a.c. voltage at a frequency of operation $F_G$, and an electronic regulating circuit connected to said generator, said circuit comprising an oscillator means for producing a precise reference frequency FR, a comparator having inputs receiving frequencies $F_R$ and $F_G$ to compare the same, and a charging means connected to the comparator and the generator to supply current to the generator when $F_G > F_R$ to brake the generator until $F_G = F_R$ and thereby provide a regulated operation of said time-wheel mechanism.

2. A watch movement as claimed in claim 1, wherein said generator includes at least one pair of magnets alternating in polarity, and at least one coil in which voltage is induced by relative travel of said magnets and the coil, said generator including a rotor driven from said drive means by which relative movement is provided between the coil and said magnets.

3. A watch movement as claimed in claim 2, wherein said magnets are secured to said rotor and said coil is fixed adjacent the rotor so that the magnets advance therepast one by one as the rotor rotates.

4. A watch movement as claimed in claim 2, wherein said generator comprises a spiral-pendulum oscillator, said rotor being an oscillator rotor.

5. A watch movement as claimed in claim 4, wherein said magnets are two in number and are mounted in opposition on said rotor, said coil being fixed adjacent the rotor so that the magnets travel therepast as the rotor oscillates.

6. A watch movement as claimed in claim 1, wherein said oscillator means comprises a quartz oscillator.

7. A watch movement as claimed in claim 1, wherein said electronic circuit is an integrated circuit with very low energy consumption.

8. A watch movement as claimed in claim 6, wherein said electronic circuit includes a rectifier producing a direct voltage V, a condensor connected to the rectifier, and an amplifier having an output signal with frequency $F_G$, said comparator being connected to the amplifier and oscillator means to compare $F_G$ and $F_R$.

9. A watch movement as claimed in claim 8, wherein said comparator is a balance counter with an addition input to which the amplifier is connected and a reduction input to which the oscillator means is connected, said counter having an output signal +V for increasing state and O for decreasing state, said circuit further comprising an inverting amplifier connected to said comparator to provide an output signal V when the input is O and an output signal O when the input is V, and a resistance means connected to said inverter.

10. A watch movement as claimed in claim 8, wherein said electronic circuit includes a rectifier producing a direct voltage V, a battery connected to the rectifier, an amplifier having an output signal with frequency $F_G$ and $F_R$, and a gate between said generator and battery and connected to said inverting amplifier and including a semi-conductor gate member which is conductive when $F_G > F_R$.

* * * * *